(12) United States Patent
Chebchoub et al.

(10) Patent No.: US 10,161,363 B1
(45) Date of Patent: Dec. 25, 2018

(54) FUEL PREHEATER FOR INTERNAL COMBUSTION ENGINE

(71) Applicant: UNITED ARAB EMIRATES UNIVERSITY, Al-Ain (AE)

(72) Inventors: Zahida Chebchoub, Al-Ain (AE); Mudhafar Al-Taee, Al-Ain (AE)

(73) Assignee: United Arab Emirates University, Al-Ain (AE)

( * ) Notice: Subject to any disclaimer, the term of this patent is extended or adjusted under 35 U.S.C. 154(b) by 0 days.

(21) Appl. No.: 15/704,686

(22) Filed: Sep. 14, 2017

(51) Int. Cl.
| | | |
|---|---|---|
| *F02M 31/00* | (2006.01) | |
| *F02M 26/13* | (2016.01) | |
| *F02M 35/10* | (2006.01) | |
| *F02M 61/14* | (2006.01) | |

(52) U.S. Cl.
CPC .......... *F02M 31/005* (2013.01); *F02M 26/13* (2016.02); *F02M 35/10216* (2013.01); *F02M 61/14* (2013.01)

(58) Field of Classification Search
CPC ...... F02M 31/00; F02M 31/005; F02M 26/13; F02M 35/10216; F02M 61/14
See application file for complete search history.

(56) References Cited

U.S. PATENT DOCUMENTS 6,889,671 B2 * 5/2005 Rigney ...................... F01N 5/02
123/549
2011/0088395 A1 4/2011 McNeil

FOREIGN PATENT DOCUMENTS

| CN | 202023661 | 11/2011 |
|---|---|---|
| CN | 203285586 | 11/2013 |
| CN | 103573484 | 2/2014 |
| CN | 203430661 | 2/2014 |
| CN | 203604072 | 5/2014 |
| WO | 2011037567 A1 | 3/2011 |

* cited by examiner

*Primary Examiner* — Hieu T Vo
(74) *Attorney, Agent, or Firm* — Richard C. Litman

(57) ABSTRACT

The fuel preheater for an internal combustion engine is a system for preheating fuel vapor prior to its injection into an internal combustion engine for combustion thereof. In the fuel preheater for an internal combustion engine, a portion of the exhaust from the internal combustion engine is used to transfer heat to a mixture of the fuel vapor, environmental air and recycled exhaust. The preheating of the fuel vapor and the addition of nitrous oxide from the recycled exhaust increases combustion efficiency of the fuel and enhances overall performance of the internal combustion engine.

13 Claims, 2 Drawing Sheets

FUEL PREHEATER FOR INTERNAL COMBUSTION ENGINE

BACKGROUND

1. Field

The disclosure of the present patent application relates to fuel injection in internal combustion engines, and particularly to a preheater for the vaporized fuel injected into an internal combustion engine.

2. Description of the Related Art

In internal combustion engines, the fuel (typically gasoline or a gasoline-ethanol mixture) is vaporized and mixed with air for combustion. It is well known that preheating gasoline or other fuel for internal combustion engines can produce more efficient vaporization, higher combustion efficiency and greater engine performance than using cold fuel. However, preheating the fuel is often not practical due to a wide variety of problems in other systems which may result, such as restrictions of cooling systems, air lock and the like. A typical fuel preheater may utilize a heat exchanger which connects in the primary cooling system, between the radiator and the engine block of the vehicle, providing the thermal energy for heating the fuel. Such systems, though, require constant monitoring and maintenance because any resultant clogs will shut down the vehicle engine cooling system. Such systems also rely on numerous mechanical parts and connections, thus increasing not only the complexity of the system but also increasing the chances of mechanical failure. Thus, a fuel preheater for an internal combustion engine solving the aforementioned problems is desired.

SUMMARY

The fuel preheater for an internal combustion engine is a system for preheating fuel vapor prior to its injection into an internal combustion engine for combustion thereof. In the fuel preheater for an internal combustion engine, a portion of the exhaust from the internal combustion engine is used to transfer heat to a mixture of the fuel vapor, environmental air and recycled exhaust. The preheating of the fuel vapor and the addition of nitrous oxide from the recycled exhaust increases combustion efficiency of the fuel and enhances overall performance of the internal combustion engine.

The fuel preheater for an internal combustion engine includes a mixing chamber, having a fluid inlet port and a fluid outlet port, and a first conduit having opposed first and second ends. The first end of the first conduit receives environmental air, and the second end of the first conduit is connected to the fluid inlet port of the mixing chamber for delivering the environmental air into an interior region thereof. At least one fuel injector is mounted within the mixing chamber for atomizing a liquid fuel, such as gasoline, a gasoline-ethanol mixture or the like, to form a fuel vapor within the interior region of the mixing chamber.

A first end of a second conduit is connected to the fluid outlet port of the mixing chamber. A heating tube is mounted about the second conduit and has opposed first and second ends. Each of the first and second ends of the heating tube is sealed about an exterior surface of the second conduit. The heating tube further has an exhaust inlet port and an exhaust outlet port.

A first end of a third conduit is connected to the exhaust outlet port of the heating tube. An opposed second end of the third conduit is connected to an inlet port of the first conduit. In use, the internal combustion engine produces exhaust in the conventional manner, and this exhaust is divided into a first portion and a second portion. The first portion is output through an exhaust pipe into the environment. The heating tube receives the second portion of the exhaust through the exhaust inlet port. The second portion of the exhaust flows about the exterior surface of the second conduit and is output from the heating tube, through the exhaust outlet port, into the third conduit.

The second portion of the exhaust is delivered to the first conduit to mix with the environmental air in order to form a mixture of the environmental air, the second portion of the exhaust and the fuel vapor in the interior region of the mixing chamber. This mixture of the environmental air, the second portion of the exhaust and the fuel vapor flows through the second conduit and is preheated by heat transfer with the second portion of the exhaust flowing through the heating tube. The mixture of the environmental air, the second portion of the exhaust and the fuel vapor is then delivered to the internal combustion engine for combustion of the fuel vapor through an opposed second end of the second conduit.

In a further embodiment, an auxiliary fuel container is provided for receiving an auxiliary volume of fuel. The first end of an air pipe receives ambient air, and a second end of the air pipe is positioned in the auxiliary volume of fuel within the auxiliary fuel container. The ambient air is bubbled through the auxiliary volume of fuel, via the air pipe, to produce an auxiliary fuel vapor above a liquid surface of the auxiliary volume of fuel. A fourth conduit then transfers the auxiliary fuel vapor to the second conduit in a region of the second conduit adjacent the second end thereof. The auxiliary fuel container acts in a manner similar to a hookah, such that bubbling of the ambient air produces an auxiliary fuel vapor which is relatively cold. This cold vapor, mixed with the ambient air, is delivered to the internal combustion engine to allow the internal combustion engine to start instantly. The cold fuel vapor ceases flowing as soon as the internal combustion engine is cranked, at which point the preheating system is used to provide preheated fuel vapor to the internal combustion engine.

These and other features of the present disclosure will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The fuel preheater for an internal combustion engine 10 is a system for preheating fuel vapor prior to its injection into an internal combustion engine 16 for combustion thereof. As will be described in greater detail below, a portion of the exhaust E from the internal combustion engine 16 is used to transfer heat to a mixture of the fuel vapor, environmental air and recycled exhaust. The preheating of the fuel vapor and the addition of nitrous oxide from the recycled exhaust increases combustion efficiency of the fuel and enhances overall performance of the internal combustion engine 16.

Figure 1:
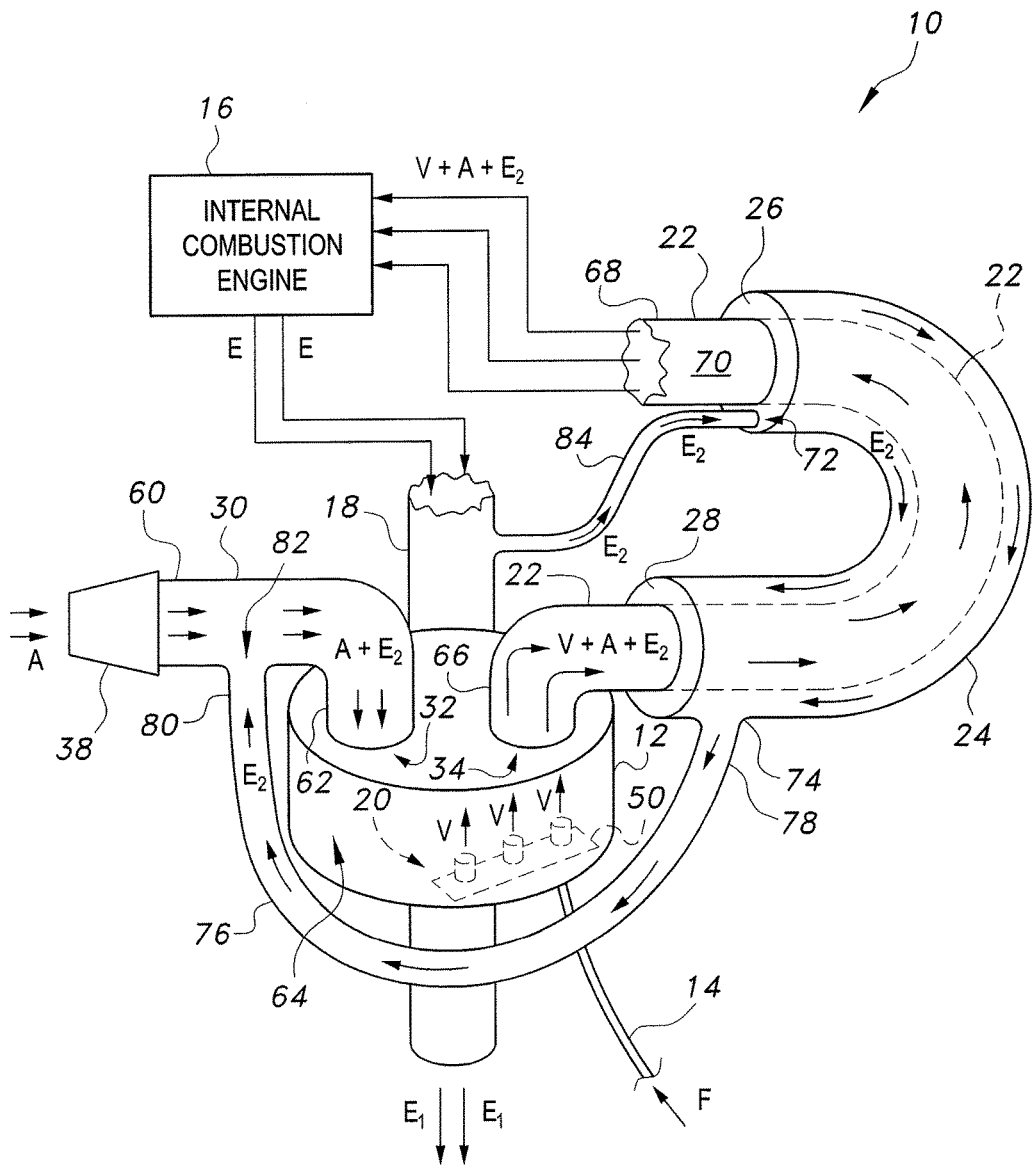
FIG. 1 diagrammatically illustrates a fuel preheater for an internal combustion engine.

As shown in FIG. 1, the fuel preheater for an internal combustion engine 10 includes a mixing chamber 12, having a fluid inlet port 32 and a fluid outlet port 34, and a first conduit 30 having opposed first and second ends 60, 62, respectively. The first end 60 of the first conduit 30 receives environmental air A, and the second end 62 of first conduit 30 is connected to the fluid inlet port 32 of the mixing chamber 12 for delivering the environmental air A into interior region 64. At least one fuel injector 20 is mounted within the mixing chamber 12 for atomizing a liquid fuel F, such as gasoline, a gasoline-ethanol mixture or the like, to form a fuel vapor V within the interior region 64 of mixing chamber 12. It should be understood that fuel injectors 20, which are shown in FIG. 1 mounted on a conventional injector rail 50, are shown for exemplary purpose only, and any suitable number, type and configuration of fuel injectors may be utilized. Similarly, it should be understood that mixing chamber 12 is shown for exemplary purposes only and may have any suitable contouring and relative dimensions. Preferably, a filter cap 38 is mounted on the first end 60 of the first conduit 30, as shown, for removing contaminants, such as pollutants, particulate matter, etc., from the environmental air A entering mixing chamber 12.

A first end 66 of a second conduit 22 is connected to the fluid outlet port 34 of the mixing chamber 12. A heating tube 24 is mounted about the second conduit 22 and has opposed first and second ends 26, 28, respectively. Each of the first and second ends 26, 28 of heating tube 24 is sealed about an exterior surface 70 of the second conduit 22, thus forming a sealed chamber about the second conduit 22, with the exception of an exhaust inlet port 72 and an exhaust outlet port 74.

A first end 78 of a third conduit 76 is connected to the exhaust outlet port 74 of the heating tube 24. An opposed second end 80 of the third conduit 76 is connected to an inlet port 82 of the first conduit 30. In use, the internal combustion engine 16, which may be any typical type of internal combustion engine, such as those found in automobiles and the like, produces exhaust E in the conventional manner. This exhaust E is divided into a first portion $E_1$ and a second portion $E_2$. The first portion $E_1$ is output through an exhaust pipe 18 into the environment. The heating tube 24 receives the second portion of the exhaust $E_2$ through the exhaust inlet port 72. The second portion of the exhaust $E_2$ flows about the exterior surface 70 of the second conduit 22 and is output from the heating tube 24, through the exhaust outlet port 74, into the third conduit 76. It should be understood that exhaust pipe 18 is shown for exemplary purposes only, and may be any typical exhaust output for an internal combustion engine. Additionally, it should be understood that the positioning of exhaust pipe 18 with respect to the various elements forming the fuel preheater for an internal combustion engine 10 is shown for exemplary purposes only.

The second portion of the exhaust $E_2$ is delivered to the first conduit 30 to mix with the environmental air A in order to form a mixture of the environmental air A, the second portion of the exhaust $E_2$ and the fuel vapor V in the interior region 64 of the mixing chamber 12. This mixture of the environmental air A, the second portion of the exhaust $E_2$ and the fuel vapor V flows through the second conduit 22 and is preheated by heat transfer with the second portion of the exhaust $E_2$ flowing through the heating tube 24. The mixture of the environmental air A, the second portion of the exhaust $E_2$ and the fuel vapor V is then delivered to the internal combustion engine 16 for combustion of the fuel vapor V through a second end 68 of the second conduit 22. Preferably, as shown, the first end 26 of the heating tube 24 is positioned adjacent the second end 68 of the second conduit 22, and the second end 28 of the heating tube 24 is positioned adjacent the first end 66 of the second conduit 22. Thus, the second portion of the exhaust $E_2$ flowing through the heating tube 24 flows generally in a direction opposite to the flow of the mixture of the environmental air A, the second portion of the exhaust $E_2$ and the fuel vapor V through second conduit 22.

Figure 2:
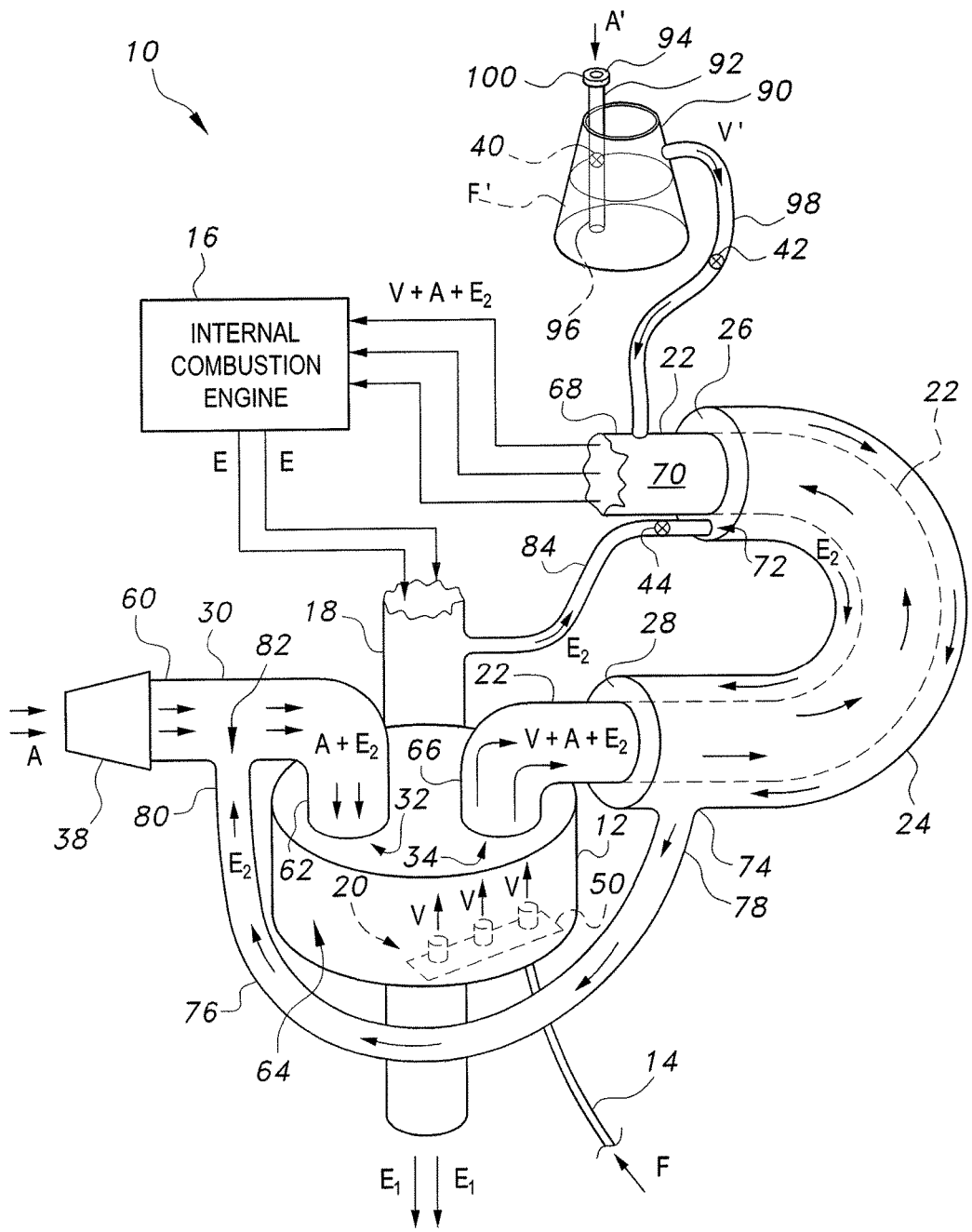
FIG. 2 diagrammatically illustrates an alternative embodiment of the fuel preheater for an internal combustion engine.

In the further embodiment of FIG. 2, an auxiliary fuel container 90 is provided for receiving an auxiliary volume of fuel F'. The first end 94 of an air pipe 92 receives ambient air A', and a second end 96 of the air pipe 92 is positioned in the auxiliary volume of fuel F' within the auxiliary fuel container 90. The ambient air A' is bubbled through the auxiliary volume of fuel F', via the air pipe 92, to produce an auxiliary fuel vapor V' above a liquid surface of the auxiliary volume of fuel F'.

A fourth conduit 98 then transfers the auxiliary fuel vapor V' to the second conduit 22 in a region of the second conduit 22 adjacent second end 68. The auxiliary fuel container 90 acts in a manner similar to a hookah, such that bubbling of the ambient air A' produces an auxiliary fuel vapor V' which is relatively cold. This cold fuel vapor V', mixed with the ambient air A', is delivered to the internal combustion engine 16 to allow the internal combustion engine 16 to start instantly. The cold fuel vapor V' ceases flowing as soon as the internal combustion engine 16 is cranked, at which point the preheating system is used to provide preheated fuel vapor to the internal combustion engine 16, as described above.

Preferably, an auxiliary filter cap 100 is mounted on the first end 94 of the air pipe 92, as shown, for removing contaminants, such as pollutants, particulate matter, etc., from the ambient air A' entering air pipe 92. Additionally, since the cold fuel vapor V' is only used before the engine is cranked, at which point the preheated fuel vapor V is used, a series of selectively closable valves are preferably provided to cease flow of cold fuel vapor V' following cranking of the internal combustion engine 16. As shown in FIG. 2, preferably, a first one-way valve 40 is mounted within the air pipe 92 for selectively preventing air flow therethrough, a second one-way valve 42 is mounted within the fourth conduit 98 for selectively preventing flow of the auxiliary fuel vapor V' therethrough, and a third one-way valve 44 is provided for selectively preventing flow of the second portion of the exhaust $E_2$ into the heating tube 24.

In tests, due to the increased combustion efficiency of the fuel using the fuel preheater for an internal combustion engine 10, carbon dioxide emissions were reduced by 93.58% and unburned hydrocarbon emissions were reduced by 50.19%. Particularly, an automobile equipped with the fuel preheater for an internal combustion engine 10 was compared against the same automobile, prior to modification, and after a 100 km drive, the unmodified control automobile was found to produce exhaust containing 1.09% carbon monoxide (CO), and unburned hydrocarbons (UHCs) were measured at 263 ppm. Following modification with the fuel preheater for an internal combustion engine 10, the same automobile was driven 100 km, and the modified automobile was found to produce exhaust containing 0.07% carbon monoxide (CO), and unburned hydrocarbons (UHCs) were measured at 131 ppm. With regard to fuel economy during this test, the unmodified automobile consumed gasoline at a rate of 11.901 km/L, and the automobile modified with the fuel preheater for an internal combustion engine 10 had a decreased consumption rate, traveling at 17.476 km/L. Thus, fuel economy for the automobile modified with the fuel preheater for an internal combustion engine 10 increased by 46.84%.

It is to be understood that the fuel preheater for an internal combustion engine is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A fuel preheater for an internal combustion engine, comprising:
 a mixing chamber having a fluid inlet port and a fluid outlet port;
 a first conduit having opposed first and second ends, the first end thereof receiving environmental air, the second end thereof being connected to the fluid inlet port of said mixing chamber for delivering the environmental air into an interior region of said mixing chamber;
 at least one fuel injector mounted within said mixing chamber for atomizing a liquid fuel to form a fuel vapor within the interior region of said mixing chamber;
 a second conduit having opposed first and second ends, the first end thereof being connected to the fluid outlet port of said mixing chamber;
 a heating tube mounted about said second conduit and having opposed first and second ends, wherein each of the first and second ends of said heating tube is sealed about an exterior surface of said second conduit, said heating tube further having an exhaust inlet port and an exhaust outlet port; and
 a third conduit having opposed first and second ends, the first end thereof being connected to the exhaust outlet port of said heating tube, the second end thereof being connected to an inlet port of said first conduit,
 wherein said heating tube receives a portion of exhaust from an internal combustion engine through the exhaust inlet port, the portion of the exhaust flowing about the exterior surface of said second conduit and being output from said heating tube into said third conduit, through the exhaust outlet port, the portion of the exhaust mixing with the environmental air to form a mixture of the environmental air, the portion of the exhaust and the fuel vapor in the interior region of said mixing chamber, the mixture of the environmental air, the portion of the exhaust and the fuel vapor flowing through said second conduit and being preheated by heat transfer with the portion of the exhaust flowing through said heating tube, the mixture of the environmental air, the portion of the exhaust and the fuel vapor being delivered to the internal combustion engine for combustion of the fuel vapor through the second end of said second conduit.

2. The fuel preheater for an internal combustion engine as recited in claim 1, further comprising a filter cap mounted on the first end of said first conduit.

3. The fuel preheater for an internal combustion engine as recited in claim 1, further comprising:
 an auxiliary fuel container for receiving an auxiliary volume of fuel;
 an air pipe having opposed first and second ends, the first end thereof receiving ambient air, the second end thereof being positioned in the auxiliary volume of fuel within the auxiliary fuel container to produce an auxiliary fuel vapor above a liquid surface of the auxiliary volume of fuel; and
 a fourth conduit for transferring the auxiliary fuel vapor to said second conduit in a region of said second conduit adjacent the second end thereof.

4. The fuel preheater for an internal combustion engine as recited in claim 3, further comprising an auxiliary filter cap mounted on the first end of the air pipe.

5. The fuel preheater for an internal combustion engine as recited in claim 3, further comprising:
 a first one-way valve mounted within the air pipe for selectively preventing air flow therethrough;
 a second one-way valve mounted within the fourth conduit for selectively preventing flow of the auxiliary fuel vapor therethrough; and
 a third one-way valve for selectively preventing flow of the portion the exhaust into said heating tube.

6. The fuel preheater for an internal combustion engine as recited in claim 1, wherein the first end of said heating tube is positioned adjacent the second end of said second conduit, and the second end of said heating tube is positioned adjacent the first end of said second conduit.

7. A fuel preheater for an internal combustion engine, comprising:
 a mixing chamber having a fluid inlet port and a fluid outlet port;
 a first conduit having opposed first and second ends, the first end thereof receiving environmental air, the second end thereof being connected to the fluid inlet port of said mixing chamber for delivering the environmental air into an interior region of said mixing chamber;
 at least one fuel injector mounted within said mixing chamber for atomizing a liquid fuel to form a fuel vapor within the interior region of said mixing chamber;
 a second conduit having opposed first and second ends, the first end thereof being connected to the fluid outlet port of said mixing chamber;
 a heating tube mounted about said second conduit and having opposed first and second ends, wherein each of the first and second ends of said heating tube is sealed about an exterior surface of said second conduit, said heating tube further having an exhaust inlet port and an exhaust outlet port;
 a third conduit having opposed first and second ends, the first end thereof being connected to the exhaust outlet port of said heating tube, the second end thereof being connected to an inlet port of said first conduit;
 an auxiliary fuel container for receiving an auxiliary volume of fuel;
 an air pipe having opposed first and second ends, the first end thereof receiving ambient air, the second end thereof being positioned in the auxiliary volume of fuel within the auxiliary fuel container to produce an auxiliary fuel vapor above a liquid surface of the auxiliary volume of fuel; and
 a fourth conduit for transferring the auxiliary fuel vapor to said second conduit in a region of said second conduit adjacent the second end thereof,
 wherein said heating tube receives a portion of exhaust from an internal combustion engine through the exhaust inlet port, the portion of the exhaust flowing about the exterior surface of said second conduit and being output from said heating tube into said third conduit, through the exhaust outlet port, the portion of the exhaust mixing with the environmental air to form a mixture of the environmental air, the portion of the exhaust, and the fuel vapor in the interior region of said mixing chamber, the mixture of the environmental air, the portion of the exhaust and the fuel vapor flowing through said second conduit and being preheated by heat transfer with the portion of the exhaust flowing through said heating tube, the mixture of the environmental air, the portion of the exhaust, and the fuel vapor being delivered to the internal combustion engine for combustion of the fuel vapor through the second end of said second conduit.

8. The fuel preheater for an internal combustion engine as recited in claim 7, further comprising a filter cap mounted on the first end of said first conduit.

9. The fuel preheater for an internal combustion engine as recited in claim 7, further comprising an auxiliary filter cap mounted on the first end of the air pipe.

10. The fuel preheater for an internal combustion engine as recited in claim 7, further comprising:
   a first one-way valve mounted within the air pipe for selectively preventing air flow therethrough;
   a second one-way valve mounted within the fourth conduit for selectively preventing flow of the auxiliary fuel vapor therethrough; and
   a third one-way valve for selectively preventing flow of the portion the exhaust into said heating tube.

11. The fuel preheater for an internal combustion engine as recited in claim 7, wherein the first end of said heating tube is positioned adjacent the second end of said second conduit, and the second end of said heating tube is positioned adjacent the first end of said second conduit.

12. A method for preheating fuel for an internal combustion engine, comprising:
   providing a fuel preheater for an internal combustion engine, the fuel preheater including:
      a mixing chamber having a fluid inlet port and a fluid outlet port;
      a first conduit having opposed first and second ends, the first end thereof receiving environmental air, the second end thereof being connected to the fluid inlet port of said mixing chamber for delivering the environmental air into an interior region of said mixing chamber;
      at least one fuel injector mounted within said mixing chamber for atomizing a liquid fuel to form a fuel vapor within the interior region of said mixing chamber;
      a second conduit having opposed first and second ends, the first end thereof being connected to the fluid outlet port of said mixing chamber;
      a heating tube mounted about said second conduit and having opposed first and second ends, wherein each of the first and second ends of said heating tube is sealed about an exterior surface of said second conduit, said heating tube further having an exhaust inlet port and an exhaust outlet port, the first end of said heating tube being positioned adjacent the second end of said second conduit, and the second end of said heating tube being positioned adjacent the first end of said second conduit; and
      a third conduit having opposed first and second ends, the first end thereof being connected to the exhaust outlet port of said heating tube, the second end thereof being connected to an inlet port of said first conduit,
   receiving a portion of exhaust in the heating tube from an internal combustion engine through the exhaust inlet port;
   flowing the portion of the exhaust about the exterior surface of said second conduit and into said third conduit, through the exhaust outlet port;
   mixing the portion of the exhaust with the environmental air to form a mixture of the environmental air, the portion of the exhaust, and the fuel vapor in the interior region of said mixing chamber;
   flowing the mixture of the environmental air, the portion of the exhaust, and the fuel vapor through said second conduit;
   preheating the mixture of the environmental air, the portion of the exhaust and the fuel vapor by heat transfer with the portion of the exhaust flowing through said heating tube; and
   delivering the mixture of the environmental air, the portion of the exhaust, and the fuel vapor to the internal combustion engine for combustion of the fuel vapor through the second end of said second conduit.

13. The method for preheating fuel for an internal combustion engine as recited in claim 12, further comprising:
   providing an auxiliary fuel container for receiving an auxiliary volume of fuel, and an air pipe having opposed first and second ends, the second end thereof being positioned in the auxiliary volume of fuel within the auxiliary fuel container;
   receiving ambient air through the first end of the air pipe;
   producing an auxiliary fuel vapor above a liquid surface of the auxiliary volume of fuel; and
   transferring the auxiliary fuel vapor through a fourth conduit to said second conduit in a region of said second conduit adjacent the second end thereof.

* * * * *